US008922505B2

(12) United States Patent  
Kang et al.

(10) Patent No.: US 8,922,505 B2
(45) Date of Patent: Dec. 30, 2014

(54) TOUCH SCREEN PANEL AND FABRICATION METHOD THEREOF

(75) Inventors: Sung-Ku Kang, Yongin (KR); Kyu-Taek Lee, Yongin (KR); Byeong-Kyu Jeon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 448 days.

(21) Appl. No.: 13/114,955

(22) Filed: May 24, 2011

(65) Prior Publication Data

US 2012/0146922 A1 Jun. 14, 2012

(30) Foreign Application Priority Data

Dec. 14, 2010 (KR) .................. 10-2010-0127793

(51) Int. Cl.
*G06F 3/041* (2006.01)
*H01R 43/00* (2006.01)
*G06F 3/044* (2006.01)

(52) U.S. Cl.
CPC ...... *G06F 3/044* (2013.01); *G06F 2203/04103* (2013.01); *G06F 2203/04111* (2013.01); *G06F 2203/04102* (2013.01)
USPC ............................................ 345/173; 29/846

(58) Field of Classification Search
None
See application file for complete search history.

(56) References Cited

U.S. PATENT DOCUMENTS

| 6,197,418 | B1 | 3/2001 | Cloots et al. |
| 6,297,811 | B1 * | 10/2001 | Kent et al. .................. 345/173 |
| 6,570,707 | B1 | 5/2003 | Murakami et al. |
| 8,248,380 | B2 | 8/2012 | Jiang et al. |
| 8,648,819 | B2 | 2/2014 | Philipp |
| 2005/0073507 | A1 | 4/2005 | Richter et al. |
| 2005/0083307 | A1 * | 4/2005 | Aufderheide et al. ........ 345/173 |
| 2005/0118922 | A1 * | 6/2005 | Endo .............................. 445/24 |
| 2006/0037934 | A1 | 2/2006 | Suginoya et al. |
| 2007/0229464 | A1 * | 10/2007 | Hotelling et al. ............. 345/173 |
| 2008/0062139 | A1 * | 3/2008 | Hotelling et al. ............. 345/173 |
| 2008/0277375 | A1 | 11/2008 | Pack et al. |

(Continued)

FOREIGN PATENT DOCUMENTS

| CN | 101857377 A | 10/2010 |
| EP | 1 100 043 A2 | 5/2001 |

(Continued)

OTHER PUBLICATIONS

Japanese Patent Office action dated Jan. 8, 2013 for corresponding Japanese application No. 2011-067974 (2 pages).

(Continued)

*Primary Examiner* — Joseph Haley
*Assistant Examiner* — Emily Frank
(74) *Attorney, Agent, or Firm* — Christie, Parker & Hale, LLP

(57) ABSTRACT

A flexible and very thin touch screen panel is implemented by forming sensing patterns as touch sensors on a first surface of a flexible thin glass substrate and by forming a supporting film on a second surface of the glass surface. A method of fabricating a touch screen panel for securing the strength of a unit cell touch screen panel includes forming sensing patterns as touch sensors in every unit cell touch screen panel on a mother glass substrate, etching the glass substrate in the thickness direction, forming a supporting film under the glass substrate, and by cutting the glass substrate and the supporting film cell by cell using dual cutting.

26 Claims, 3 Drawing Sheets

(56) References Cited

U.S. PATENT DOCUMENTS

| | | |
|---|---|---|
| 2009/0090694 A1 | 4/2009 | Hotelling et al. |
| 2009/0303191 A1 | 12/2009 | Yang |
| 2010/0013785 A1 | 1/2010 | Murai et al. |
| 2010/0026664 A1 | 2/2010 | Geaghan |
| 2010/0182274 A1 | 7/2010 | Kang et al. |
| 2011/0187666 A1 | 8/2011 | Min |
| 2012/0075207 A1 | 3/2012 | Jang |
| 2012/0263945 A1 | 10/2012 | Yoshikawa |
| 2013/0120288 A1 | 5/2013 | Min |

FOREIGN PATENT DOCUMENTS

| | | |
|---|---|---|
| EP | 1 710 212 A1 | 10/2006 |
| EP | 2 211 257 | 7/2010 |
| EP | 2 374 766 A1 | 10/2011 |
| JP | 2001-142644 A | 5/2001 |
| JP | 2002-278701 | 9/2002 |
| JP | 2008-033777 A | 2/2008 |
| JP | 2008-153138 | 7/2008 |
| JP | 2008-153188 A | 7/2008 |
| JP | 2009-059666 | 3/2009 |
| JP | 3152611 U | 8/2009 |
| JP | 4565670 B1 | 8/2010 |
| JP | 2010-254551 | 11/2010 |
| KR | 10-2008005485 A | 6/2008 |
| KR | 10-2008-0110477 A | 12/2008 |
| KR | 10-2009-0110770 | 10/2009 |
| KR | 10-2010008425 A | 7/2010 |
| KR | 10-2012-0032735 | 4/2012 |
| TW | 1264675 B | 10/2006 |
| TW | 200805128 A | 1/2008 |
| WO | WO 2008/108042 A1 | 9/2008 |
| WO | WO 2010/024542 A2 | 3/2010 |
| WO | WO 2010/074748 A1 | 7/2010 |

OTHER PUBLICATIONS

KIPO Office action dated Jan. 28, 2013 for corresponding KR 10-2010-0127793 (1 sheet).

KIPO Office action dated Jul. 2, 2012 for KR 10-2010-0127793 (3 pages).

EPO Search Report dated Jun. 24, 2013, for corresponding European Patent application 11184405.6, (8 pages).

JPO Office action dated Nov. 5, 2013, for corresponding Japanese Patent application 2011-067974, (3 pages).

EPO Search Report dated Nov. 5, 2013, for corresponding European Patent application 11184405.6, (15 pages).

Taiwanese Office action dated Mar. 11, 2014, with English translation, for corresponding Taiwan Patent application 100121042, (19 pages).

SIPO Office action dated Apr. 25, 2014, for corresponding Chinese Patent application 201110187658.4, (10 pages).

* cited by examiner

TOUCH SCREEN PANEL AND FABRICATION METHOD THEREOF

CROSS-REFERENCE TO RELATED APPLICATION

This application claims priority to and the benefit of Korean Patent Application No. 10-2010-0127793, filed on Dec. 14, 2010, in the Korean Intellectual Property Office, the entire content of which is incorporated herein by reference.

BACKGROUND

1. Field

Aspects of embodiments according to the present invention relate to a touch screen panel, and particularly, to a flexible touch screen panel and a fabrication method thereof.

2. Description of the Related Art

A touch screen panel is an input device enabling a person to select an instruction displayed on a screen of an image display device with his/her finger or a tool and to input a user command.

To this end, the touch screen panel is provided on a front face of the image display device and converts a contact position on the screen, which is directly contacted by a finger or a tool, into an electrical signal. By doing so, an instruction selected at the contact position is received as an input signal.

The touch screen panel has an increasing range of applications because the touch screen panel can be a substitute of a separated input device such as a keyboard or a mouse that is coupled to an image display device.

There are known touch screen panels such as a resistive touch screen panel, a light sensitive touch screen panel, and a capacitive touch screen panel. The capacitive touch screen panel converts a contact position into an electric signal by sensing change of electrostatic capacity generated by a conductive sensing pattern in association with another sensing pattern or a ground electrode when a finger or an object contacts the touch screen.

Such touch screen panel is attached to an outer surface of a flat panel display device such as a liquid crystal display (LCD) or an organic light emitting display (OLED) device. Therefore, the touch screen panel has high transparency and thin thickness.

In addition, a flexible flat display device has been developed recently and the touch screen panel attached to the flexible flat display device should also be flexible.

However, since processes such as a thin film membrane and a pattern forming process are used in order to form a sensing pattern for implementing a touch sensor, the capacitive touch screen panel has high heat resistance and chemical resistance.

Therefore, in a known capacitance touch screen panel, a sensing pattern is formed on a glass substrate suitable for the process. However, in this case, since the glass substrate should have a sufficient thickness to allow the glass substrate to be transferred, the glass substrate does not have a thin thickness to provide for flexibility.

SUMMARY

Embodiments of the present invention are directed toward a flexible and thin touch screen panel implemented by forming sensing patterns as touch sensors on a first surface of a flexible thin glass substrate and by forming a supporting film on a second surface of the glass substrate.

In addition, embodiments of the present invention are also directed toward a method of fabricating a touch screen panel for guaranteeing or improving the strength of a unit cell touch screen panel, by forming sensing patterns as touch sensors in every unit cell touch screen panel on a mother glass substrate, by etching the glass substrate in the thickness direction, by forming a supporting film under the glass substrate, and by cutting the glass substrate and the supporting film cell by cell using dual cutting.

In order to achieve the foregoing and/or other aspects of the present invention, according to an embodiment of the present invention, there is provided a touch screen panel including: a glass substrate including an active area and a non-active area positioned outside of the active area; sensing patterns at the active area on a first surface of the glass substrate; sensing lines at the non-active area on the first surface of the glass substrate and coupled to the sensing patterns; and a supporting film on a second surface of the glass substrate.

The glass substrate may have a thickness of 25 μm to 50 μm and has flexibility.

In addition, the supporting film may include a transparent resin, and the transparent resin may include at least one selected from the group consisting of polyester (PET), polyether surfone (PES), triacetyl cellulose (TAC), and cycleolefin polymer (COP), and the supporting film may have a thickness of 25 μm to 125 μm.

The touch screen panel may further include a first transparent adhesive layer between the second surface of the glass substrate and the supporting film, and the first transparent adhesive layer may have a thickness of 5 μm to 30 μm.

In addition, the touch screen panel may further include a window substrate attached to the first surface of the glass substrate, the window substrate may include at least one selected from the group consisting of polymethyl methacrylate (PMMA), acryl, and polyester (PET).

The touch screen panel may further include a second transparent adhesive layer between the first surface of the glass substrate and a window substrate, and the second transparent adhesive layer may have a thickness of 50 μm to 200 μm.

The first transparent adhesive layer or the second transparent adhesive layer may include a super view resin (SVR) or an optically clear adhesive (OCA).

Each of the sensing patterns may include: first sensing cells coupled to each other in a first direction; first connecting lines for coupling adjacent ones of the first sensing cells to each other; second sensing cells coupled to each other in a second direction; and second connecting lines for coupling adjacent ones of the second sensing cells to each other, and the touch screen panel may further include insulating layers at crossing regions between the first connecting lines and the second connecting lines.

In addition, the touch screen panel may further include a black matrix at the non-active area on the first surface of the glass substrate.

In order to achieve the foregoing and/or other aspects of the present invention, according to an embodiment of the present invention, there is provided a method of fabricating a touch screen panel including: forming respective touch screen panels on a first surface of a mother glass substrate, the touch screen panels being at respective cell unit areas on the mother glass substrate; forming a protecting layer on the first surface of the mother glass substrate and the touch screen panels; spraying an etchant onto a second surface of the mother glass substrate to etch the mother glass substrate into a thinned glass substrate; attaching a supporting film on the second surface of the thinned glass substrate; removing a part of the protecting layer corresponding to boundary regions of the respective cell unit areas; spraying an etchant onto a part of the thinned glass substrate exposed by removing the part of the protecting layer to cut the thinned glass substrate; and cutting the supporting film that is exposed by cutting the thinned glass substrate and removing the protecting layer.

The supporting film may be cut using laser and the protecting layer may be an attachable and detachable film or paste.

According to the embodiments of the present invention, the flexible and thin film touch screen panel is implemented to be attached to the upper surface or a lower surface of a window of a flat display device, so that the increased thickness can be minimized and the flexibility can be maintained.

In addition, the sensing patterns, which function as touch sensors, are formed in every cell on a mother glass substrate, the glass substrate is etched in the thickness direction, a supporting film is formed under the glass substrate, and the glass substrate and the supporting film cell are cut cell by cell using dual cutting so that minute cracks formed on the cutting section can be prevented and ultimate strength of the touch screen panel and productivity can be secured.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
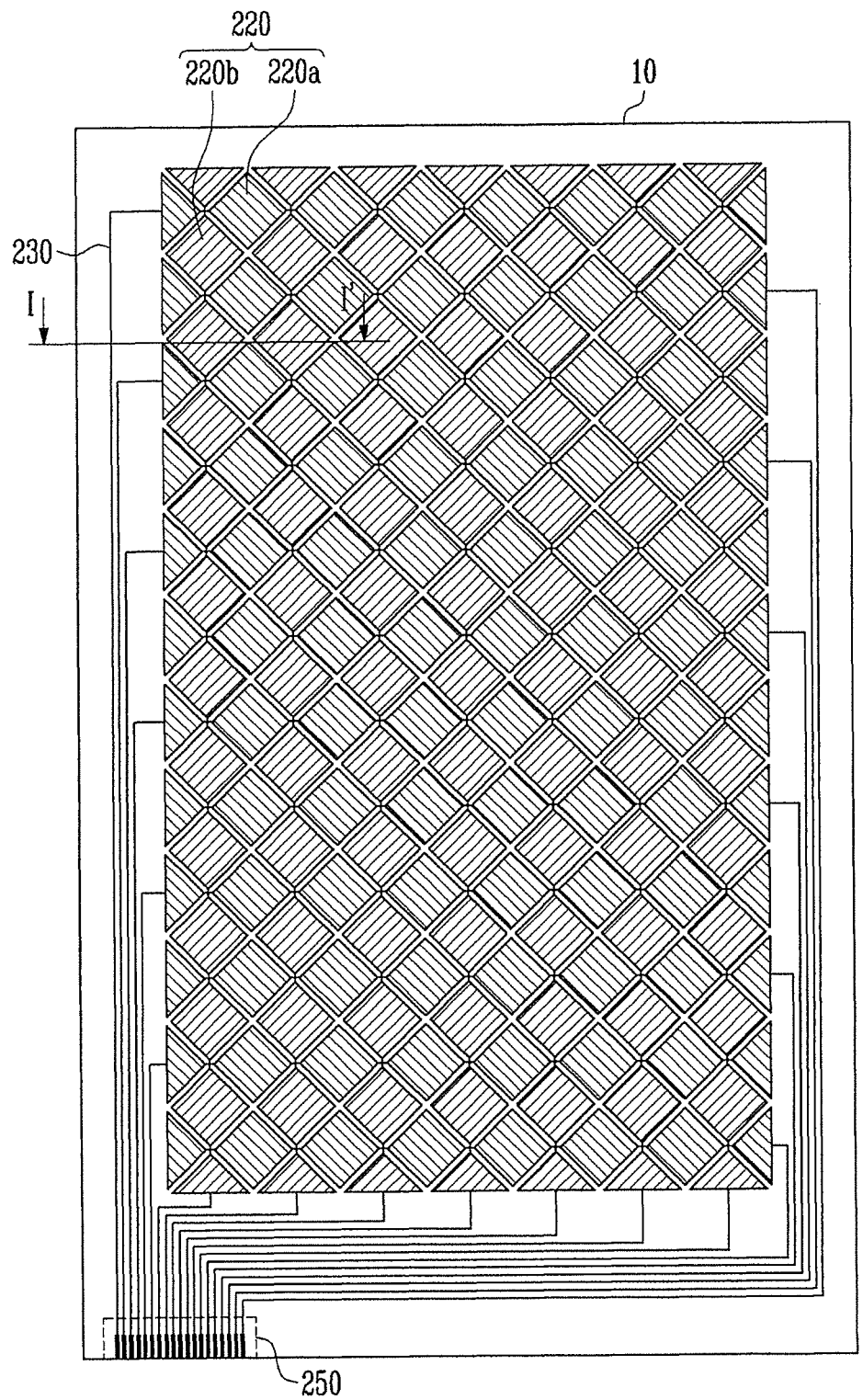
FIG. 1 is a plan view schematically illustrating a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, the embodiments of the present invention will be described in detail with reference to the accompanying drawings.

Figure 2:
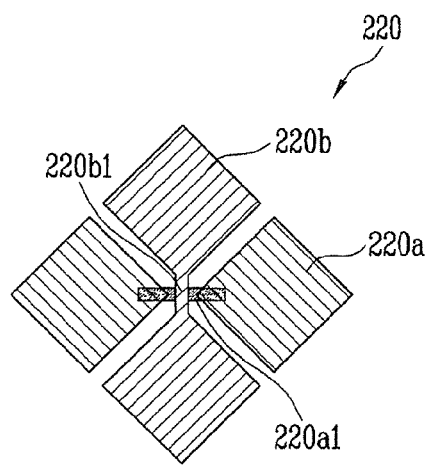
FIG. 2 is an enlarged view illustrating an example of a sensing pattern in FIG. 1.

FIG. 1 is a plan view schematically illustrating a touch screen panel according to an embodiment of the present invention. FIG. 2 is an enlarged view illustrating an example of a sensing pattern in FIG. 1.

Figure 3:
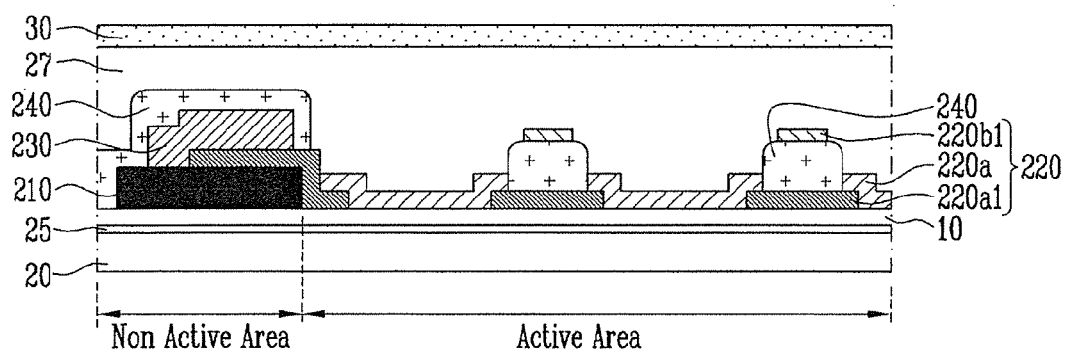
FIG. 3 is a cross sectional view of the touch screen panel according to an embodiment of the present invention, taken along the line I-I' shown in FIG. 1.

FIG. 3 is a cross sectional view of the touch screen panel according to an embodiment of the present invention, taken along the line I-I' shown in FIG. 1.

Referring to FIGS. 1 to 3, a touch screen panel according to an embodiment of the present invention includes a glass substrate 10 with a suitable thickness that provides flexibility, sensing patterns 220 formed on a first surface of the glass substrate 10, and sensing lines 230 for coupling the sensing patterns 220 to an external driving circuit (not shown) through a pad unit 250.

In general, the glass substrate 10 satisfies characteristics of transparency, high heat resistance, and chemical resistance, suitable to form the sensing patterns 220, and is widely used.

However, the existing glass substrate has a thickness (e.g., a predetermined thickness), for example, 0.3 mm to 0.5 mm, to be transferred during the fabrication of the touch screen panel. Due to the thickness, the glass substrate is not substantially flexible.

That is, it is difficult to apply a touch screen panel formed with the above described glass substrate to a flexible flat display device.

Since the glass substrate becomes more flexible or bendable when the thickness of the glass substrate is thinner than about 50 μm, in the embodiments of the present invention, the glass substrate has reduced thickness to have flexibility.

In this case, to a second surface of the glass substrate 10, that is, to the lower surface of the glass substrate 10, a flexible supporting film 20 is attached so that the glass substrate 10 can be prevented from being broken by an excessive force during handling.

In the described embodiments, the slimming process of thinning the glass substrate 10 is performed after forming the sensing patterns 220 on the glass substrate 10 and hereinafter the method of fabricating a touch screen panel according to an embodiment of the present invention will be described in detail with reference to FIG. 4.

Configuration of the touch screen panel according to the embodiment of the present invention is as follows.

First, the sensing patterns 220, as illustrated in FIG. 2, include a plurality of first sensing cells 220a coupled to each other in a row line in a row direction, a plurality of first connecting lines 220a1 for coupling the first sensing cells 220a in the row direction, a plurality of second sensing cells 220b coupled to each other in a column line in a column direction, and a plurality of second connecting lines 220b1 for coupling the second sensing cells 220b in the column direction.

Although FIG. 2 shows a part of the sensing patterns 220, the touch screen panel has a structure in which the sensing patterns 220, as illustrated in FIG. 2, are arranged repeatedly.

The first sensing cells 220a and the second sensing cells 220b are alternately arranged to avoid overlapping with each other, and the first connecting lines 220a1 and the second connecting lines 220b1 cross each other. In this case, insulating layers (not shown) are disposed between the first connecting lines 220a1 and the second connecting lines 220b1 in order to guarantee stability.

Here, the first sensing cells 220a and the second sensing cells 220b may be integrated with the first connecting lines 220a1 and the second connecting lines 220b1, respectively, using transparent conductive material such as indium tin oxide (hereinafter, referred to as ITO), or may be separately made to be electrically coupled to the first connecting lines 220a and the second connecting lines 220b1, respectively.

For example, the second sensing cells 220b are integrally patterned with the second connecting lines 220b1 and the first sensing cells 220a are patterned between the second sensing cells 220b to be independent patterns and to be coupled to each other in the row direction by the first connecting lines 220a1 that are positioned thereon or thereunder.

In this case, the first connecting lines 220a1 may directly make contact with and be electrically coupled to the first sensing cells 220a on or under the first sensing cells 220a, or may be electrically coupled to the first sensing cells 220a through contact holes.

The first connecting lines 220a1 may be made of transparent conductive material such as ITO or opaque low resistance metal such that width thereof may be controlled to prevent or reduce the patterns from being visualized.

In addition, the sensing lines 230 as illustrated in FIG. 1, are electrically coupled to the first and second sensing cells, 220a and 220b, by the column or row unit and couple the first and second sensing cells, 220a and 220b, to an external driving circuit (not shown) such as a position detecting circuit through the pad unit 250.

The sensing lines 230 are arranged at a non-active area outside of an active area on which an image is displayed and may be made of low resistance metal such as molybdenum (Mo), silver, (Ag), titanium (Ti), copper (Cu), aluminum (Al), or molybdenum/aluminum/molybdenum (Mo/Al/Mo) in addition to the transparent conductive material used in forming the sensing patterns 220.

The above-mentioned touch screen panel according to one embodiment of the present invention is a capacitive touch screen panel. In the touch screen panel, when an object such as a finger or a stylus pen makes contact with the touch screen panel, a change of capacitance according to the contact position is transmitted from the sensing patterns 220 to the driving circuit (not shown) via the sensing lines 230 and the pad unit 250. Then, the change of capacitance is converted into an electric signal by X- and Y-input processing circuits (not shown) so that the contact position is detected.

FIG. 3 is a cross sectional view illustrating a part of the non-active area and an active area of the touch screen panel, formed on the first surface of the glass substrate 10 having a thickness (e.g., a predetermined thickness) enabling flexibility.

Referring to FIG. 3, the sensing patterns 220 formed at the active area of the glass substrate 10 include the first sensing cells 220a formed to be coupled to each other in every row line in the first direction, the first connecting lines 220a1 for coupling the first sensing cells 220a to each other in the row direction, the second sensing cells 220b formed to be coupled to each other in every column line in the column direction, the second connecting lines 220ba for coupling the second sensing cells 220b to each other in the column direction, and insulating layers 240 located at the crossing regions between the first connecting lines 220a1 and the second connecting lines 220b1.

Although FIG. 3 shows enlarged thickness of elements such as the sensing patterns 220 forming the touch screen panel, this is made for illustrative purposes and actual thicknesses of the respective elements may be smaller than those depicted in FIG. 3.

In addition, as illustrated, the black matrix 210 and the sensing lines 230 overlapped with the black matrix 210 and electrically coupled to the sensing patterns 220 are formed at the non-active area positioned outside of the active area.

In this case, the black matrix 210 prevents patterns such as the sensing lines that are formed in the non-active area from being visualized and performs a function of forming a rim of the displaying region.

In this embodiment of the present invention, the glass substrate 10 has a thickness of 20 μm to 50 μm to have suitable flexibility.

The glass substrate 10 could be flexible when the thickness of the glass substrate 10 is less than 50 μm. However, since cracks may be easily generated and it is hard to manage the etching process when the thickness is less than 15 μm, the glass substrate 10 employed in an embodiment of the present invention may have a thickness of 25 μm to 30 μm.

In addition, as illustrated in FIG. 3, in this embodiment of the present invention, the supporting film 20 having flexibility is attached to the lower surface of the glass substrate 10 so that the glass substrate 10 may be prevented from being broken by excessive bending caused by an external force.

The supporting film 20 may be made of transparent resin, for example, polyester (PET), polyether surfone (PES), tri-acetyl cellulose (TAC), and cycle-olefin polymer (COP), or other suitable materials.

Since there is no substantial phase difference between the TAC and the COP, the TAC and the COP may be utilized as the supporting film 20, and the supporting film 20 may have a thickness of 25 μm to 125 μm.

The attachment of the supporting film 20 to the second surface (e.g., the lower surface) of the glass substrate 10 may be implemented by a first transparent adhesive layer 25 disposed between the supporting film 20 and the glass substrate 10, wherein the first transparent adhesive layer 25 may be made of a transparent adhesive material having high light transmission such as a super view resin (SVR) or an optically clear adhesive (OCA).

However, in one embodiment of the present invention, the first transparent adhesive layer 25 may have a thickness of 5 μm to 30 μm.

In addition, the touch screen panel, implemented to be attached to an upper surface of a flat display device (not shown), further includes a window substrate 30 provided on an upper surface of the touch screen panel for improved mechanical strength.

Since the flat display device and the touch screen panel, as mentioned above, may be flexible, the window substrate 30 may also be made of a flexible material.

Therefore, in one embodiment of the present invention, the window substrate 30 may be made of polymethyl methacrylate (PMMA), acryl, or polyester (PET) and have a thickness of about 0.7 mm.

The attachment of the window substrate 30 to the first surface of the glass substrate 10 on which the sensing patterns 220 are formed may be implemented by a second transparent adhesive layer 27 disposed between the window substrate 30 and the glass substrate 10, wherein the second transparent adhesive layer 27 may be made of a transparent adhesive material having high light transmission such as a super view resin (SVR) or an optically clear adhesive (OCA) like in the first transparent adhesive layer 25.

In one embodiment of the present invention, the second transparent adhesive layer 27 may have a thickness of 50 μm to 200 μm.

Hereinafter, a fabrication process of the touch screen panel according to an embodiment of the present invention will be described in detail with reference to FIGS. 4A to 4F.

FIGS. 4A to 4F are cross sectional views sequentially illustrating a method of fabricating a touch screen panel according to an embodiment of the present invention.

Figure 4A:
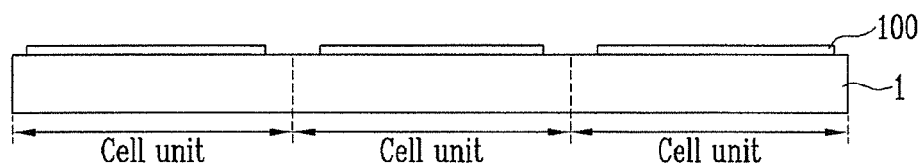
FIGS. 4A, 4B, 4C, 4D, 4E, and 4F are cross sectional views sequentially illustrating a method of fabricating a touch screen panel according to an embodiment of the present invention.

First, referring to FIG. 4A, touch screen panels 100 are formed on a first surface of a mother glass substrate 1, that is, a plurality of touch screen panels 100 would be formed cell by cell, in every cell region on the mother glass substrate 1.

In one embodiment of the present invention, for illustrative purpose, the mother glass substrate 1 has three cells, but the present invention is not limited thereto.

In addition, each of the touch screen panels 100, as described with reference to FIGS. 1 to 3, includes the sensing patterns 220 formed at the active area, the black matrix 210 formed at the non-active area, and the sensing lines 230, but the detailed description of these elements will be omitted in FIG. 4A for ease of illustration.

The mother glass substrate 1 has a thickness (e.g., a predetermined thickness), for example, 0.3 mm to 0.5 mm, such that the mother glass substrate 1 may be transferred during the fabrication process.

Figure 4B:
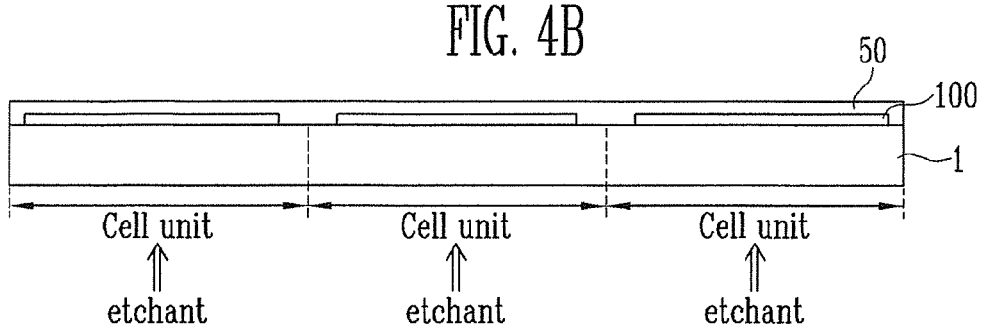

Referring to FIG. 4B, when the touch screen panels 100 are completely formed in every cell region, a slimming process is performed to the second surface of the mother glass substrate 1, that is, a surface opposite to the surface on which the touch screen panels 100 are formed.

The slimming process may be carried out by etching, and, for example, an etchant such as hydrofluoric acid (HF) is used to etch the mother glass substrate 1.

In other embodiments, a mixture of HF and phosphoric acid/nitric acid/sulfuric acid/$NH_4F$ or a mixture of $NH_4F$/$NF_4F_2H$ and surface active agent may be mainly used as an etchant.

However, since the etchant used in the slimming process should not permeate the touch screen panels 100 formed on the first surface of the mother glass substrate 1, a protecting layer 50 is formed on the first surface of the mother glass substrate 1 as illustrated in FIG. 4B.

The protecting layer 50 is implemented to be attachable and detachable and may be made in the form of a film or a paste.

The slimming process of the mother glass substrate 1 may be implemented in various ways. That is, the slimming process may be performed by putting the mother glass substrate 1 into a vessel filled up with the etchant, by bringing the etchant in contact with the mother glass substrate 1 while loading the mother glass substrate 1 onto a conveyor to transfer the mother glass substrate 1, arranging the mother glass substrate 1 perpendicular to the ground, and by spraying the etchant onto the second surface of the mother glass substrate to etch the overall mother glass substrate 1 uniformly.

Figure 4C:
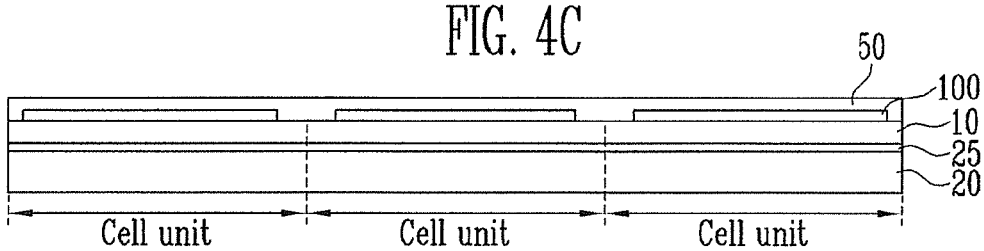

A thinned mother glass substrate 10 produced by etching the mother glass substrate 1 by the slimming process, as illustrated in FIG. 4C, is thinned to 20 μm to 50 μm so that the thinned mother glass substrate 10 may be flexible.

The thinned mother glass substrate 10 would be flexible when the thickness is less than 50 μm. However, since cracks would be easily generated and it is hard to manage the etching process when the thickness of the thinned mother glass substrate 10 is less than 15 μm, the thickness of the thinned mother glass substrate 10 employed in one embodiment of the present invention may be 25 μm to 30 μm.

In addition, as illustrated in FIG. 4C, in this embodiment of the present invention, the supporting film 20 having suitable flexibility is attached to the lower surface of the thinned mother glass substrate 10 so that the thinned mother glass substrate 10 may be prevented from being broken by excessive bending caused by an external force.

In this case, the supporting film 20 may be made of transparent resin such as polyester (PET), polyether sulfone (PES), triacetyl cellulose (TAC), and cycle-olefin polymer (COP).

Since there is no substantial phase difference between the TAC and the COP, the TAC and the COP may be utilized as the supporting film 20 and the supporting film 20 may have a thickness of 25 μm to 125 μm.

The attachment of the supporting film 20 to the second surface of the thinned mother glass substrate 10 may be implemented by the first transparent adhesive layer 25 between the supporting film 20 and the thinned mother glass substrate 10, wherein the first transparent adhesive layer 25 may be made of a transparent adhesive material having high light transmission such as a super view resin (SVR) or an optically clear adhesive (OCA).

In one embodiment of the present invention, the first transparent adhesive layer 25 may have a thickness of 5 μm to 30 μm.

Next, the plurality of touch screen panels 100 are cut by every cell unit area. In one embodiment of the present invention, a dual cutting process of cutting the thinned mother glass substrate 10 and the supporting film 20 by different methods is used to prevent minute cracks from being generated and to guarantee ultimate strength and productivity of the touch screen panel.

In more detail, the thinned mother glass substrate 10 is cut by the cell unit using the etching process like in the slimming process as illustrated in FIG. 4B and the lower supporting film 20 is cut by laser cutting process.

Figure 4D:
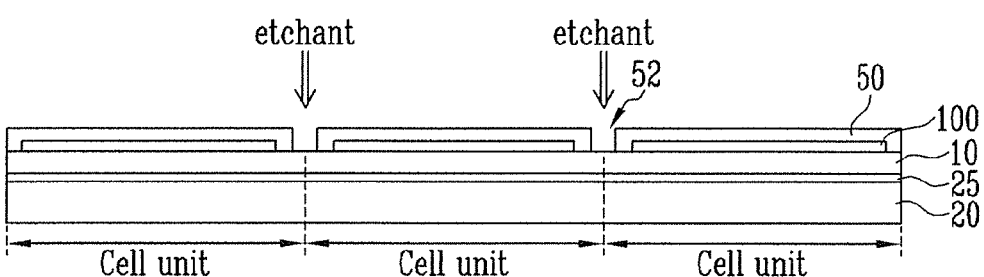

To this end, referring to FIG. 4D, parts of the protecting layer 50 corresponding to portions 52 are cut by the respective cell unit regions on the upper surface of the thinned mother glass substrate 10. That is, the boundary regions of the respective cell units are removed.

In other words, as illustrated, parts of the thinned mother glass substrate 10 corresponding to the portions 52 to be cut are exposed.

The above-mentioned etchant is sprayed onto the exposed regions so that the exposed substrate is etched and the thinned mother glass substrate 10 is cut cell by cell.

Figure 4E:
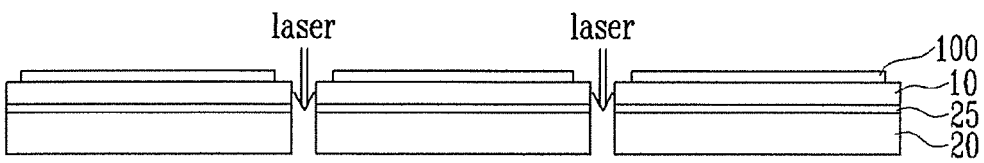

After the thinned mother glass substrate 10 is cut cell by cell, laser cutting is performed to the same regions as illustrated in FIG. 4E, that is, the regions exposed by cutting the thinned mother glass substrate 10, such that the supporting film 20 positioned under the thinned mother glass substrate 10 is cut. After that, the protecting layers 50 are removed cell by cell and finally every cell unit, that is, the touch screen panels 100 are completed.

Figure 4F:
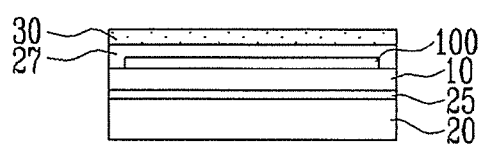

In addition, as described above, the touch screen panel 100, implemented to be attached to an upper surface of a flat display device (not shown), further includes a window substrate 30 provided on an upper surface of the touch screen panel for the improved mechanical strength as illustrated in FIG. 4F.

Since the flat display device and the touch screen panel, as mentioned above, may be flexible, the window substrate 30 may be also made of a suitable flexible material such as polymethyl methacrylate (PMMA), acryl, and polyester (PET) and have a thickness of about 0.7 mm according to one embodiment.

The attachment of the window substrate 30 to the touch screen panels being at respective cell unit areas on which the sensing patterns are formed may be implemented by a second transparent adhesive layer 27 between the window substrate 30 and the thinned mother glass substrate 10, wherein the second transparent adhesive layer 27 may be made of a transparent adhesive material having high light transmission such as a super view resin (SVR) or an optically clear adhesive (OCA) like in the first transparent adhesive layer 25.

In one embodiment of the present invention, the second transparent adhesive layer 27 may have a thickness of 50 μm to 200 μm.

The present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
    a glass substrate comprising an active area and a non-active area positioned outside of the active area;
    sensing patterns at the active area on a first surface of the glass substrate;
    sensing lines at the non-active area on the first surface of the glass substrate and coupled to the sensing patterns;
    a supporting film on a second surface of the glass substrate; and
    a first transparent adhesive layer between the second surface of the glass substrate and the supporting film, wherein the first transparent adhesive layer contacts the entire area of the second surface.

2. The touch screen panel as claimed in claim 1, wherein the glass substrate has a thickness of 25 μm to 50 μm.

3. The touch screen panel as claimed in claim 1, wherein the supporting film comprises a transparent resin.

4. The touch screen panel as claimed in claim 3, wherein the transparent resin comprises at least one selected from the group consisting of polyester (PET), polyether surfone (PES), triacetyl cellulose (TAC), and cycle-olefin polymer (COP).

5. The touch screen panel as claimed in claim 3, wherein the supporting film has a thickness of 25 μm to 125 μm.

6. The touch screen panel as claimed in claim 1, wherein the first transparent adhesive layer comprises a super view resin (SVR) or an optically clear adhesive (OCA).

7. The touch screen panel as claimed in claim 1, wherein the first transparent adhesive layer has a thickness of 5 μm to 30 μm.

8. The touch screen panel as claimed in claim 1, further comprising a window substrate attached to the first surface of the glass substrate.

9. The touch screen panel as claimed in claim 8, wherein the window substrate comprises at least one selected from the group consisting of polymethyl methacrylate (PMMA), acryl, and polyester (PET).

10. The touch screen panel as claimed in claim 1, further comprising a second transparent adhesive layer between the first surface of the glass substrate and a window substrate.

11. The touch screen panel as claimed in claim 10, wherein the second transparent adhesive layer has a thickness of 50 μm to 200 μm.

12. The touch screen panel as claimed in claim 10, wherein the second transparent adhesive layer comprises a super view resin (SVR) or an optically clear adhesive (OCA).

13. The touch screen panel as claimed in claim 1, wherein each of the sensing patterns comprises:
    first sensing cells coupled to each other in a first direction;
    first connecting lines for coupling adjacent ones of the first sensing cells to each other;
    second sensing cells coupled to each other in a second direction; and
    second connecting lines for coupling adjacent ones of the second sensing cells to each other.

14. The touch screen panel as claimed in claim 13, further comprising insulating layers at crossing regions between the first connecting lines and the second connecting lines.

15. The touch screen panel as claimed in claim 1, further comprising a black matrix at the non-active area on the first surface of the glass substrate.

16. A method of fabricating a touch screen panel comprising:
    forming touch screen panels on a first surface of a mother glass substrate, the touch screen panels being at respective cell unit areas on the mother glass substrate;
    forming a protecting layer on the first surface of the mother glass substrate and the touch screen panels;
    spraying an etchant onto a second surface of the mother glass substrate to etch the mother glass substrate into a thinned mother glass substrate;
    disposing a first transparent adhesive layer on the second surface of the thinned mother glass substrate;
    attaching a supporting film on the first transparent adhesive layer;
    removing a part of the protecting layer corresponding to boundary regions of the respective cell unit areas;
    spraying an etchant onto a part of the thinned mother glass substrate exposed by removing the part of the protecting layer to cut the thinned mother glass substrate; and
    cutting the supporting film that is exposed by cutting the thinned mother glass substrate and removing the protecting layer,
    wherein the first transparent adhesive layer contacts the entire area of the second surface.

17. The method as claimed in claim 16, wherein the thinned mother glass substrate has a thickness of 25 μm to 50 μm.

18. The method as claimed in claim 16, wherein the supporting film comprises at least one selected from the group consisting of polyester (PET), polyether surfone (PES), triacetyl cellulose (TAC), and cycle-olefin polymer (COP).

19. The method as claimed in claim 18, wherein the supporting film has a thickness of 25 μm to 125 μm.

20. The method as claimed in claim 16, wherein the supporting film is cut using laser.

21. The method as claimed in claim 16, wherein the first transparent adhesive layer has a thickness of 5 μm to 30 μm.

22. The method as claimed in claim 16, further comprising attaching a window substrate to the touch screen panels being at respective cell unit areas.

23. The method as claimed in claim 22, wherein the window substrate comprises at least one selected from the group consisting of polymethyl methacrylate (PMMA), acryl, and polyester (PET).

24. The method as claimed in claim 22, wherein the attachment of the window substrate to the touch screen panels further comprises disposing a second transparent adhesive layer between the first surface of the thinned mother glass substrate and the window substrate.

25. The method as claimed in claim 24, wherein the second transparent adhesive layer has a thickness of 50 μm to 200 μm.

26. The method as claimed in claim 16, wherein the protecting layer comprises an attachable and detachable film or paste.

* * * * *